(12) United States Patent
Birch et al.

(10) Patent No.: US 11,059,342 B2
(45) Date of Patent: *Jul. 13, 2021

(54) ACTUATOR SYSTEM

(71) Applicant: JAGUAR LAND ROVER LIMITED, Coventry (GB)

(72) Inventors: Luke Birch, Shipston on Stour (GB); Sam Brown, Coventry (GB); Robert Neilson, Coventry (GB); James Robertson, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 245 days.

This patent is subject to a terminal disclaimer.

(21) Appl. No.: 16/133,801

(22) Filed: Sep. 18, 2018

(65) Prior Publication Data

US 2019/0084366 A1 Mar. 21, 2019

(30) Foreign Application Priority Data

Sep. 19, 2017 (GB) ..................................... 1715068

(51) Int. Cl.
*B60G 17/08* (2006.01)
*B60G 13/14* (2006.01)
(Continued)

(52) U.S. Cl.
CPC ............. *B60G 17/08* (2013.01); *B60G 13/14* (2013.01); *B60G 15/06* (2013.01); *B60G 17/015* (2013.01);
(Continued)

(58) Field of Classification Search
CPC .... B60G 17/08; B60G 13/14; B60G 17/0195; B60G 15/06; B60G 17/0165;
(Continued)

(56) References Cited

U.S. PATENT DOCUMENTS 3,921,746 A * 11/1975 Lewus .................. B60G 13/14
180/165
4,911,468 A 3/1990 Fukunaga
(Continued)

FOREIGN PATENT DOCUMENTS

GB 2518901 A 4/2015
JP H04143113 A 5/1992

OTHER PUBLICATIONS

Combined Search and Examination Report corresponding to application No. GB 1715068.1, dated Mar. 8, 2018, 2 pages.

*Primary Examiner* — Paul N Dickson
*Assistant Examiner* — Timothy Wilhelm
(74) *Attorney, Agent, or Firm* — Reising Ethington P.C.

(57) ABSTRACT

An actuator system for a vehicle suspension system includes: an actuator having a piston and a first fluid chamber separated from a second fluid chamber by the piston; a hydraulic pump having a first port connected by a first hydraulic circuit to the first chamber via a first valve, the first valve being a damper valve operable to variably restrict flow of hydraulic fluid out of the first chamber; a first hydraulic accumulator connected to the first hydraulic circuit between the first port and the first valve; and a second hydraulic accumulator connected to the first port by a second valve, the second valve being a variable pressure relief valve operable to variably restrict flow of hydraulic fluid from the first port to the second hydraulic accumulator.

20 Claims, 2 Drawing Sheets

(51) Int. Cl.
*B60G 17/0195* (2006.01)
*B60G 15/06* (2006.01)
*B60G 17/0165* (2006.01)
*B60G 17/015* (2006.01)

(52) U.S. Cl.
CPC ..... *B60G 17/0165* (2013.01); *B60G 17/0195* (2013.01); *B60G 2202/24* (2013.01); *B60G 2202/413* (2013.01); *B60G 2204/62* (2013.01); *B60G 2300/07* (2013.01); *B60G 2300/60* (2013.01); *B60G 2400/82* (2013.01); *B60G 2400/821* (2013.01); *B60G 2500/10* (2013.01); *B60G 2500/11* (2013.01); *B60G 2500/114* (2013.01)

(58) Field of Classification Search
CPC ............ B60G 17/015; B60G 2400/821; B60G 2500/11; B60G 2202/24; B60G 2500/114; B60G 2300/07; B60G 2400/82; B60G 2300/60; B60G 2500/10; B60G 2202/413; B60G 2204/62; B60G 17/016; B60W 10/22

See application file for complete search history.

(56) References Cited

U.S. PATENT DOCUMENTS

| | | | | |
|---|---|---|---|---|
| 5,215,327 A * | 6/1993 | Gatter | B60G 11/32 | 267/225 |
| 5,269,556 A * | 12/1993 | Heyring | B60G 11/26 | 280/5.508 |
| 5,342,023 A * | 8/1994 | Kuriki | B60G 17/0185 | 267/64.16 |
| 5,682,968 A * | 11/1997 | Boichot | B60G 17/0152 | 188/266.2 |
| 5,682,980 A * | 11/1997 | Reybrouck | B60G 17/04 | 280/124.16 |
| 5,915,701 A * | 6/1999 | Heyring | B60G 21/06 | 280/124.157 |
| 6,003,427 A * | 12/1999 | Asbrand | B62D 5/062 | 91/447 |
| 6,318,742 B2 * | 11/2001 | Franzini | B60G 21/06 | 280/124.106 |
| 6,321,887 B1 * | 11/2001 | Kurusu | B60G 17/018 | 188/266.2 |
| 6,394,238 B1 * | 5/2002 | Rogala | B60G 13/14 | 188/266.2 |
| 6,405,750 B1 * | 6/2002 | Rogala | B60G 17/0152 | 137/493.8 |
| 6,416,061 B1 * | 7/2002 | French | B60G 17/0162 | 280/5.514 |
| 6,575,484 B2 * | 6/2003 | Rogala | B60G 13/14 | 280/124.158 |
| 6,755,113 B2 * | 6/2004 | Shih | F15B 1/021 | 91/5 |
| 7,143,875 B2 * | 12/2006 | Matsunaga | F16F 15/027 | 188/266.5 |
| 7,234,386 B2 * | 6/2007 | Schedgick | B60G 13/14 | 92/113 |
| 7,347,117 B2 * | 3/2008 | Nassif | F15B 11/024 | 192/85.63 |
| 7,390,002 B2 * | 6/2008 | Kasamatsu | B60G 17/0162 | 280/124.159 |
| 7,490,836 B2 * | 2/2009 | Hou | B60G 17/015 | 180/41 |
| 7,497,452 B2 * | 3/2009 | Schedgick | B60G 11/27 | 188/313 |
| 7,726,665 B2 * | 6/2010 | Bitter | B60G 17/0162 | 280/5.502 |
| 7,735,838 B2 * | 6/2010 | Rades | B60G 17/0162 | 280/5.507 |
| 7,751,959 B2 * | 7/2010 | Boon | B60G 17/0152 | 701/38 |
| 7,878,311 B2 * | 2/2011 | Van Weelden | F16F 9/465 | 188/322.15 |
| 8,096,568 B2 * | 1/2012 | Huth | B60G 17/056 | 280/124.16 |
| 8,209,087 B2 * | 6/2012 | Hagglund | B60G 17/0162 | 701/37 |
| 8,521,361 B2 * | 8/2013 | Larkins | B60G 17/018 | 701/37 |
| 8,636,120 B1 * | 1/2014 | Rogers | F16F 9/46 | 188/318 |
| 8,672,337 B2 * | 3/2014 | van der Knaap | B60G 17/0152 | 280/124.106 |
| 8,820,064 B2 * | 9/2014 | Six | B60G 17/056 | 60/414 |
| 8,966,889 B2 * | 3/2015 | Six | F15B 1/021 | 60/413 |
| 9,108,484 B2 * | 8/2015 | Reybrouck | B60G 17/0272 | |
| 9,481,221 B2 * | 11/2016 | Reybrouck | F16F 9/46 | |
| 9,586,456 B2 * | 3/2017 | Reybrouck | B60G 17/056 | |
| 9,657,749 B2 * | 5/2017 | Bissbort | F04B 53/10 | |
| 9,784,288 B2 * | 10/2017 | Six | B60G 17/0416 | |
| 9,879,744 B2 * | 1/2018 | Haller | B60G 99/002 | |
| 9,919,687 B2 * | 3/2018 | Kamiya | B60T 13/686 | |
| 10,160,277 B2 * | 12/2018 | Ohashi | B60G 17/0157 | |
| 10,343,180 B2 * | 7/2019 | Rouyer | B05B 13/005 | |
| 10,352,338 B2 * | 7/2019 | Hahn | E02F 9/2217 | |
| 10,421,330 B2 * | 9/2019 | Jeong | B60G 17/019 | |
| 10,434,835 B2 * | 10/2019 | Six | F15B 13/027 | |
| 10,508,705 B2 * | 12/2019 | Funke | F16F 9/19 | |
| 10,518,599 B2 * | 12/2019 | Kuriki | B60G 13/14 | |
| 10,525,182 B2 * | 1/2020 | Burbank | A61M 1/1613 | |
| 10,557,512 B2 * | 2/2020 | Forster | F16F 9/325 | |
| 2006/0175166 A1 * | 8/2006 | Fischer | F16F 9/512 | 188/322.13 |
| 2010/0308589 A1 * | 12/2010 | Rohrer | F03B 13/188 | 290/53 |
| 2011/0187065 A1 * | 8/2011 | Van Der Knaap | B60G 17/016 | 280/5.507 |
| 2014/0190156 A1 * | 7/2014 | Reybrouck | B60G 13/14 | 60/431 |
| 2016/0102686 A1 * | 4/2016 | An | F15B 13/042 | 60/430 |
| 2016/0238041 A1 * | 8/2016 | Kajita | E02F 9/2296 | |
| 2017/0057317 A1 * | 3/2017 | Schmidt | B60G 13/14 | |
| 2017/0240017 A1 * | 8/2017 | Vandersmissen | B60G 17/01908 | |
| 2017/0349022 A1 * | 12/2017 | Masamura | F16F 15/02 | |
| 2018/0154728 A1 * | 6/2018 | Giovanardi | B60G 17/0165 | |
| 2018/0264908 A1 * | 9/2018 | Masamura | B60G 13/08 | |
| 2018/0345750 A1 * | 12/2018 | Chikamatsu | B60G 21/026 | |
| 2019/0084366 A1 * | 3/2019 | Birch | B60G 17/015 | |
| 2019/0084367 A1 * | 3/2019 | Birch | B60G 15/06 | |
| 2019/0084368 A1 * | 3/2019 | Birch | B60G 17/08 | |
| 2019/0360505 A1 * | 11/2019 | Belter | B60G 17/0416 | |
| 2019/0381850 A1 * | 12/2019 | Hoult | B60G 17/019 | |

* cited by examiner

ACTUATOR SYSTEM

TECHNICAL FIELD

The present disclosure relates to an actuator system. Particularly, but not exclusively, the disclosure relates to an actuator system for a vehicle suspension. Aspects of the invention relate to an actuator system, to a vehicle, and to a method of operating a vehicle.

BACKGROUND

Suspension systems on vehicles are known to improve the ride of the vehicle compared to a vehicle without any suspension.

Thus, the wheels, or other ground engaging structures such as tracks, of a vehicle with suspension, are able to move relative to the body of the vehicle. As such, the body has various degrees of freedom (DOF) of movement. The significant DOF are "heave" i.e. movement in a vertical direction, pitch and roll.

Motion of the vehicle body in heave, pitch and roll at frequencies close to the first damped natural frequency of each respective degree of freedom are known as primary body motions. They are typically defined as frequencies from 1 to 3 Hz. Primary body motions may be road induced, but in the case of roll and pitch, primary body motions may also be driver induced.

The motion of the vehicle body in heave, pitch and roll at frequencies above the first damped natural frequency of each respective degree of freedom are known as secondary body motions. They are typically defined as frequencies above 3-4 Hz. Secondary body motions are almost exclusively road induced.

Passive suspension systems are also known wherein the system reacts to wheel to body motion.

Active suspension systems are known wherein the characteristics of the suspension system are modified depending upon the immediate suspension requirements. Active suspension systems operate both dependently and independently of wheel to body motion and generate forces on request. An active suspension system needs to deal with both low frequency active force demands as well as disturbance inputs which may tend to have a higher frequency content. Active force demands are force requests calculated to provide a desired vehicle behavior and in pursuit of which the various elements of the actuation system are controlled. Satisfying these force demands may necessitate the addition of energy into the suspension system, or the extraction of energy from the suspension system (e.g. damping). These active force demands are typically, though not exclusively, limited to primary body motion frequencies. Disturbance inputs are displacement/velocity disturbance inputs to the actuation system resulting from either the road surface profile or motion of the body.

It is an aim of the present invention to address disadvantages associated with the prior art.

SUMMARY

Aspects and embodiments of the invention provide an actuator system, a vehicle, and a method of operating a vehicle as claimed in the appended claims.

According to an aspect of the invention, there is provided an actuator system for a vehicle suspension system comprising:

an actuator having a piston and a first fluid chamber separated from a second fluid chamber by the piston;

a hydraulic pump having a first port connected by a first hydraulic circuit to the first chamber via a first valve, the first valve being a damper valve operable to variably restrict flow of hydraulic fluid out of the first chamber;

a first hydraulic accumulator connected to the first hydraulic circuit between the first port and the first valve;

a second hydraulic accumulator connected to a second gallery;

the hydraulic pump having a second port connected by a second hydraulic circuit to the second chamber via a third valve, the third valve being a damper valve operable to variably restrict flow of hydraulic fluid out of the second chamber, a third hydraulic accumulator connected to the second hydraulic circuit between the second port and the third valve; and the first hydraulic circuit having a first gallery being connected to the second accumulator by a second valve, the second valve being a variable pressure relief valve operable to variably restrict flow of hydraulic fluid from the first gallery to the second gallery, the second hydraulic circuit having a third gallery being connected to the second accumulator by a fourth valve, the fourth valve being a variable pressure relief valve operable to variably restrict flow of hydraulic fluid from the third gallery to the second gallery.

This provides the advantage that the separate accumulators provide compliances for the separate high and low frequency force demands. The first accumulator is always connected and in use, accommodating the relatively low power high frequency force demands, whereas the second accumulators are only required for low frequency demands, which results in larger flows and hence require more power. This decoupling allows the second accumulators to be used only when required therefore reducing the average power consumption of the system without adversely affecting its response time.

According to another aspect of the invention there is provided a vehicle including a ground engaging structure mounted on a suspension system attached to a vehicle body thereby defining a sprung mass and an unsprung mass, the vehicle including the actuator system as defined in the above aspect of the invention acting at least to partially support the sprung mass on the unsprung mass, wherein one or more or all of the
first valve,
first accumulator,
third valve, and
third accumulator
define at least a part of the unsprung mass,
and/or wherein one or more or all of the
second valve,
second accumulator,
fourth valve, and
pump
define at least a part of the sprung mass.

According to yet another aspect of the invention there is provided a method of operating the vehicle of the above mentioned another aspect of the invention, the method including:

a) defining a first target pressure for the first chamber, b) operating the pump to generate the first target pressure in the first chamber and the first accumulator, c) setting the second valve relief pressure to a value dependent upon the first target pressure.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
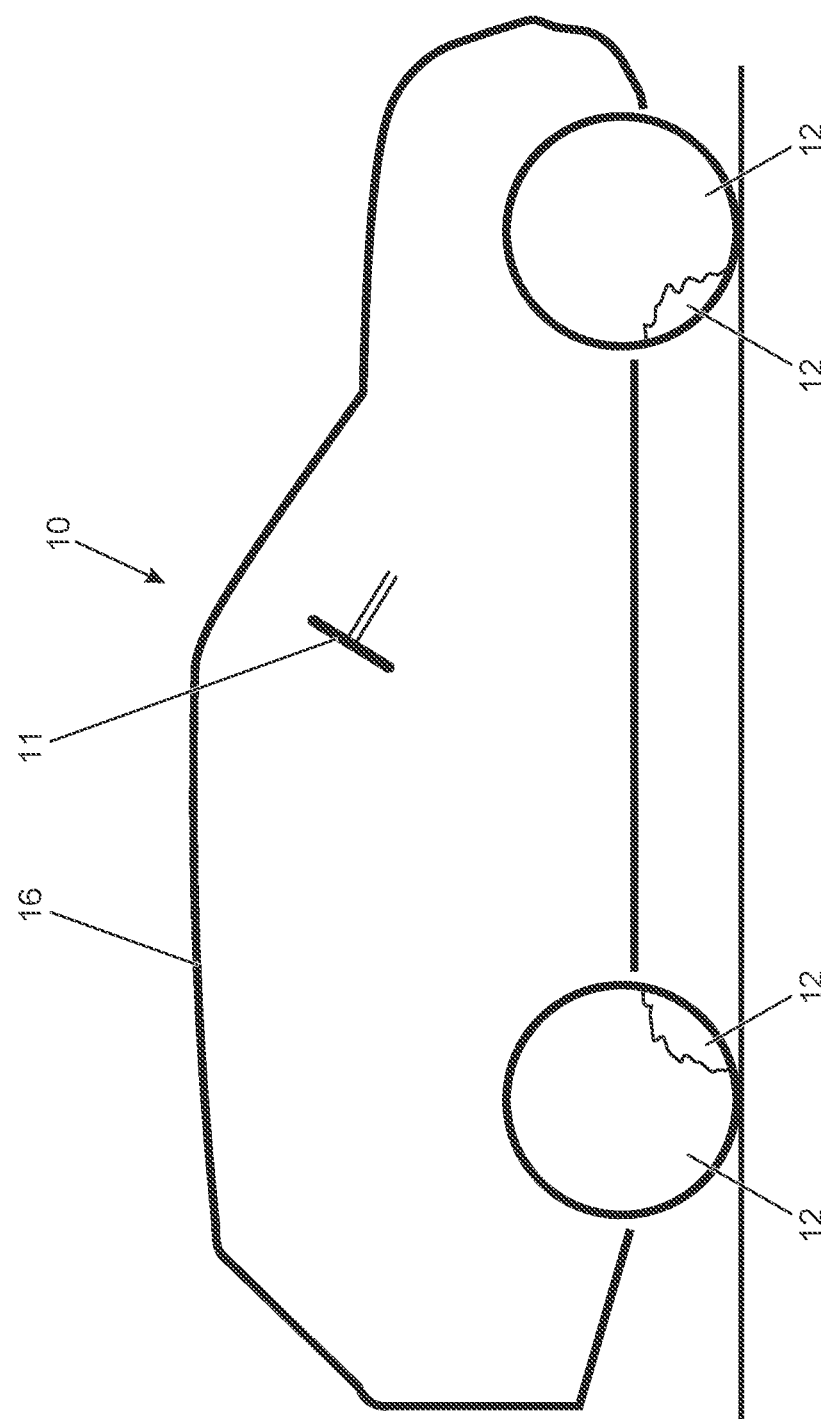
FIG. 1 is a vehicle according to an embodiment of the present invention including at least one actuator system.

With reference to the figures there is shown a vehicle 10 having ground engaging structure, in this case a form of four wheels 12. An active suspension system 14 connects each wheel 12 to a body 16 of the vehicle 10.

The vehicle therefore defines a sprung mass which includes body 16 and further components which will be described below, and an unsprung mass which includes wheels 12 and further components which will be described below.

Each suspension system 14 includes an actuator system 17 having an actuator 18 which couples the body 16 to the associated wheel 12. The suspension system also includes a spring 20 which couples the body 16 to the associated wheel 12. The spring 20 can be any type of spring, for example the helical spring or an air spring. As will be appreciated from FIG. 2, the actuator 18 and spring 20 act in parallel.

The actuator 18 includes a cylinder 22 containing a piston 24. The cylinder 22 is connected to the wheel 12 and the piston is connected to the body 16 via a rod 26. The piston defines a first fluid chamber C1 and a second fluid chamber C2. The piston fluidly isolates the first fluid chamber C1 from the second fluid chamber C2.

The actuator system 17 also includes a pump P having a first port P1 and a second port P2.

The actuator system 17 includes valves V1, V2, V3 and V4.

Valve V1 includes a damper valve V1A and a check valve V1B. Similarly valve V3 includes a damper valve V3A and a check valve V3B.

As shown damper valve V1A and V3A each comprises an array (in this case 3) of relief valves and associated restrictors. In further embodiments any suitable type of damper valve could be used including any type of variable damper valve or any type of non-variable damper valve.

Valves V2 and V4 are both variable pressure relief valves.

The actuator system 17 also includes hydraulic accumulators A1, A2, A3 and hydraulic galleries G1, G2 and G3.

The actuator system 17 also includes check valves X1 and X2.

Gallery G1 fluidly connects port P1 of pump P, outlet X10 of check valve X1, inlet V21 of valve V2, hydraulic accumulator A1, and port V1C of valve V1.

Similarly, gallery G3 connects port P2 of pump P with outlet X20 of check valve X2, inlet V41 of valve V4, hydraulic accumulator A3, and port V3C of valve V3.

Gallery 30 connects the first fluid chamber C1 with port V1D of valve V1. Similarly gallery 32 connects the second fluid chamber C2 with port V3D of valve V3.

Gallery G2 connects hydraulic accumulator A2 with outlet V20 of valve V2 outlet V40 of valve V4 inlet X11 of check valve X1 and inlet X21 of check valve X2.

Figure 2:
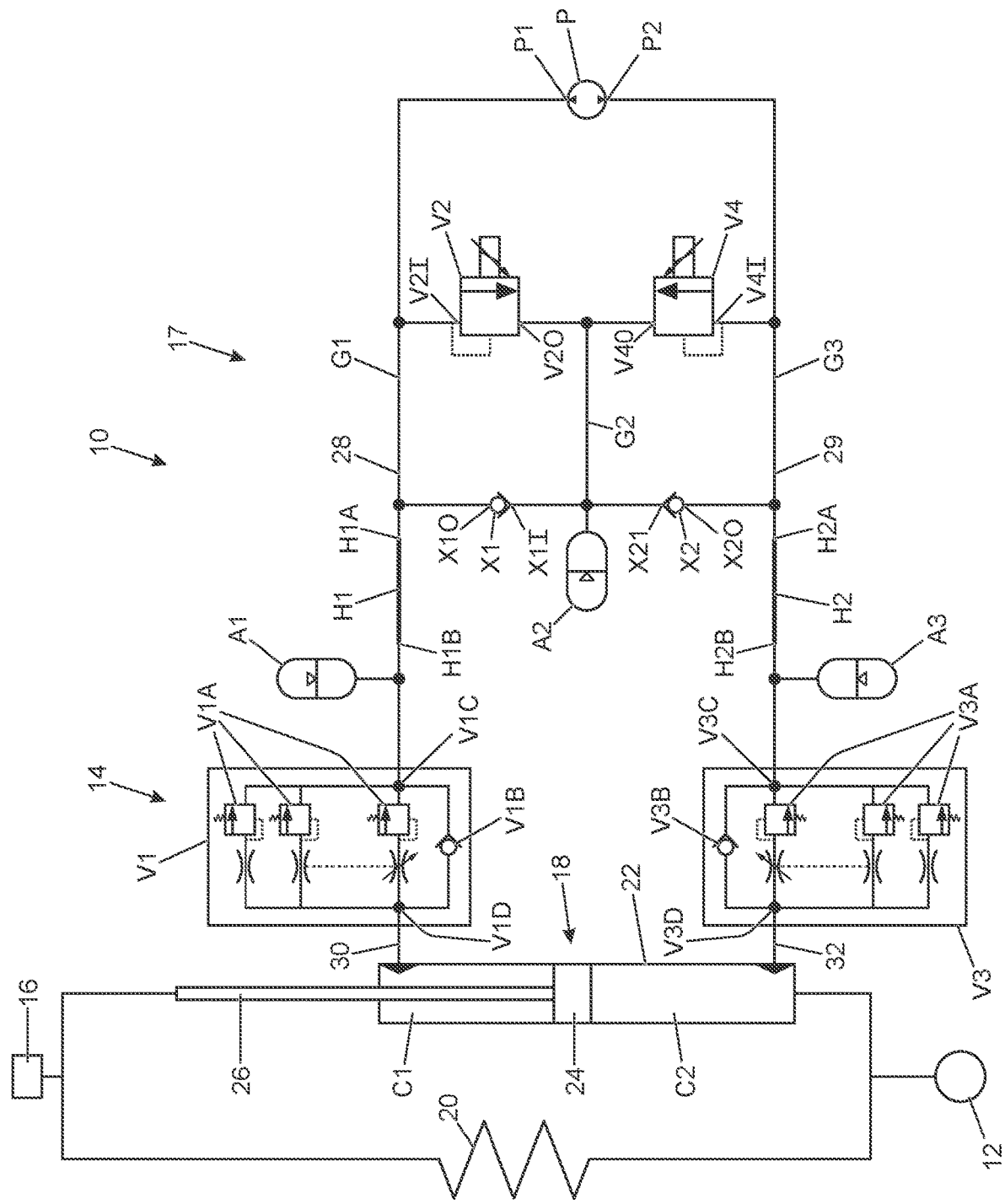
FIG. 2 is a schematic view of an actuator system according to an embodiment of the present invention used on the vehicle of FIG. 1.

As can be seen from FIG. 2, a first hydraulic circuit 28 defined at least by gallery G1 and gallery 30 connect the first port P1 of the hydraulic pump P to the first chamber C1. Similarly, a second hydraulic circuit 29 defined at least by gallery G3 and gallery 32 connect the second port P2 of the hydraulic pump P1 with the second chamber C2.

In use, the body 16 is supported on the wheel by the spring 20 and the actuator 18. The actuator 18 is used to improve the ride of the vehicle by creating a force that tends to extend the actuator, i.e. that tends to move the piston 24 upwards when viewing FIG. 2 relative to the cylinder 22, or by creating a force which tends to contract the actuator 18, i.e. that tends to move piston 24 downwardly when viewing FIG. 2 relative to the cylinder 22. As will be appreciated, an extension force in actuator 18 may cause the body 16 to rise relative to the wheel, whereas a contraction force in actuator 18 may cause the body 16 to lower relative to the wheel, dependent on the balance of forces elsewhere in the system.

By way of example, when the vehicle is negotiating a right-hand bend, the vehicle naturally tends to roll to the left and this left-hand roll can be at least partially countered by an actuator 18 associated with an outside wheel (in this example a left-hand wheel) creating an extension force and an actuator 18 associated with an inside wheel (in this example right hand wheel) creating a contraction force.

However, as the wheel is negotiating the exemplary right-hand bend, an outside wheel and/or an inside wheel may hit a bump and/or a depression in the road and the suspension system needs to be able to accommodate any such bumps or depressions.

As will be appreciated, as the driver turns the steering wheel 11 in an exemplary clockwise direction, this causes a driver induced input, in this case steering the vehicle to the right which then causes leftward roll of the vehicle body (i.e. a primary body motion) and the leftward roll can be compensated for by the actuator system 17 associated with the various wheels, i.e. an active force demand is created to counter the leftward roll. Similarly, disturbance inputs such as bumps and depressions in the road cause secondary body motions which the suspension system must also accommodate.

Driver induced inputs tend to be relatively slow when compared to road induced inputs. In one example, driver induced inputs may typically occur at a frequency of less than 3 Hz whereas road induced inputs occur at a significantly higher frequency, for example between 3 and 30 Hz. The suspension system needs to accommodate the relatively low frequency driver induced inputs and the relatively high frequency road induced inputs.

Operation of the suspension system 14 is as follows:

Example 1

In this example, the wheel 12 shown in FIG. 2 is a front left wheel. The vehicle is travelling along a straight and notionally smooth road. The front left of the vehicle is being supported substantially entirely by spring 20, and as such actuator 18 is not creating any significant force, i.e. it does not create an extension force nor does it create a contraction force.

The driver then creates a driver induced input by turning the steering wheel 11 clockwise which causes the vehicle to turn to the right which in turn will tend to cause the vehicle to roll to the left. In order to prevent or minimize or control roll to the left the suspension system creates an active force demand by causing the second fluid chamber C2 to be pressurized to a target pressure which causes an extension force to be generated by the actuator 18, thereby reducing the leftward roll.

In more detail, sensors (not shown) in association with an algorithm or the like and a computer or the like determine an appropriate target pressure in second fluid chamber C2. The target pressure may be based on multiple variables, by way of example forward vehicle speed, vehicle weight, load within vehicle, comfort mode setting of suspension, radius of turn etc. The relief valve setting of valve V4 is set to the target pressure for chamber C2. When it is determined that the actual pressure in second fluid chamber C2 is below the target pressure, then the pump P is operated so as to pump fluid from first gallery G1 into the third gallery G3. As the pressure in gallery G3 rises, hydraulic fluid may flow past check valve V3B causing the hydraulic pressure in gallery 32 and hence in the second fluid chamber C2 to also rise. Hydraulic pressure in hydraulic accumulator A3 will similarly rise. As the pressure in gallery G3 increases, so the pressure in gallery G1 may fall. Check valve X2 will prevent fluid flow through the valve from gallery G3 to gallery G2 when the pressure in gallery G3 is greater than the pressure in gallery G2. However, as the pressure in gallery G1 drops, in particular to a pressure below the pressure in gallery G2 then check valve X1 will open, thereby equalizing the pressure in galleries G1 and G2.

As the pressure in the second fluid chamber C2 increases, the piston 24 may rise (when viewing FIG. 2) causing hydraulic fluid to be expelled from the first fluid chamber C1. The expelled fluid will flow into gallery G1 dependent upon the flow characteristics of valve V1A, thus replacing some of the fluid lost from gallery G1 to gallery G3 via pump P. Fluid from hydraulic accumulator A1 may pass into gallery G1.

After a period of time a steady equilibrium will be reached wherein the pressure in gallery G3, accumulator A3, gallery 32 and in the second fluid chamber C2 are all equal. The magnitude of this steady state pressure (the target pressure) will determine the appropriate pump speed bearing in mind the leakage characteristics of the pump. In the interest of system performance, it is desirable to minimize the time taken to reach the target pressure, and to minimize the energy used to charge accumulator A3. To this end, accumulator A3 is a relatively small capacity accumulator.

As the vehicle continues to negotiate the right-hand bend consider the scenario where there is a disturbance input in the form of the wheel 12 hitting a bump. While the target pressure in the second fluid chamber C2 is tending to extend the actuator 18, the bump in the road will cause the actuator 18 to contact thereby causing hydraulic fluid to flow out of the second fluid chamber C2 and consequently into the first fluid chamber C1. Fluid flow into the first fluid chamber C1 is provided primarily by hydraulic fluid from accumulator A1 flowing through valve V1B. However, hydraulic fluid flowing out of the second fluid chamber C2 is damped by valve V3A. Thus, valve V3A acts as a damper valve under these circumstances. Hydraulic fluid passing through valve V3A will primarily cause fluid to flow into accumulator A3.

Once the bump has been negotiated the piston 24 will return to its steady state position. The bump will create a high frequency road induced input which is accommodated primarily by accumulator A3 which is close to second fluid chamber C2 when compared with accumulator A2 (as will be discussed further below).

However, if the bump is sufficiently big, movement of the piston 24 within the cylinder 22 may cause the pressure in chamber C2 and gallery G3 to increase above the relief valve pressure setting of valve V4 in which case valve V4 will momentarily open so as to limit the pressure in gallery G3. Simultaneously the large bump will cause the volume of chamber C1 to increase in size and hydraulic fluid may, in addition to flowing out of accumulator A1 into gallery G1 and on to gallery 30 via valve V1B, also flow out of accumulator A2 into gallery G1 via check valve X1 and on to gallery 30 via valve V1B.

Alternatively, while negotiating the right-hand bend, there is a disturbance input in the form of the wheel 12 hitting a pot hole or the like thereby causing the actuator 18 to extend. This extension causes hydraulic fluid to flow out of the first fluid chamber C1 and consequently into the second fluid chamber C2. Hydraulic fluid flow into the second fluid chamber C2 is provided primarily by hydraulic fluid from accumulator A3 passing through valve V3B. Hydraulic fluid flowing out of the first fluid chamber C1 is restricted by valve VIA which acts as a damper valve. Hydraulic fluid passing through valve VIA will primarily cause fluid to flow into accumulator A1. Once the pot hole has been negotiated the piston 24 will return to its steady state position. The pot hole will create a high frequency road induced input which is accommodated primarily by accumulator A1 which is close to first fluid chamber C1 when compared with accumulator A2 (as will be discussed further below).

However, if the pot hole is sufficiently large, movement of the piston 24 within the cylinder 22 may cause the pressure in chamber C2 and gallery G3 to fall to a pressure below that of gallery G2. Under these circumstances check valve X2 will momentarily open allowing hydraulic fluid from gallery G2 to pass into gallery G3, thereby equalizing the pressures in galleries G2 and G3. Once the large pot hole has been negotiated, the piston 24 will return to its steady state position and as it does so the pressure in gallery G3 will increase to above the target pressure and hence valve V4 will open, thereby reducing the pressure in gallery G3 to the target pressure.

Example 2

Assume the vehicle is initially turning right as per example 1. In the present example the driver then creates a driver induced input by turning the steering wheel 11 in an opposite direction (in an anticlockwise direction) which causes the vehicle to turn to the left which in turn causes the vehicle to roll in the opposite direction, in this case to the right. The wheel 12 shown in FIG. 2 is the front left wheel and therefore becomes an inside wheel of the turn and under these circumstances, instead of creating a target pressure for the second fluid chamber C2, rather a target pressure is now created for the first fluid chamber C1 so as to control suspension extension. The actual pressure in the first fluid chamber C1 will be below the target pressure, and so the pump is operated in the reverse direction from example 1, so as to pump fluid from the third gallery G3 into the first gallery G1. As the pressure in gallery G1 rises, hydraulic fluid will flow past check valve V1B causing the hydraulic pressure in gallery 30 and hence the pressure in the first fluid chamber C1 to also rise. Hydraulic pressure in hydraulic accumulator A1 will similarly rise. As the pressure in gallery G1 increases, so the pressure in gallery G3 may fall. Check valve X1 will prevent fluid flow through the valve from gallery G1 to gallery G2 when the pressure in gallery G1 is greater than the pressure in gallery G2. However, as the pressure in gallery G3 drops, in particular to a pressure below the pressure in gallery G2 then check valve X2 will open, thereby equalizing the pressure in galleries G3 and G2.

As the pressure in the first fluid chamber C1 increases, the piston 24 may move down (when viewing FIG. 2) causing hydraulic fluid to be expelled from the second fluid chamber C2. The expelled fluid will flow into gallery G3 dependent upon the flow characteristics of valve V3A, thus replacing some of the fluid lost from gallery G3 to gallery G1 via pump P. Fluid from hydraulic accumulator A3 may pass into gallery G3.

After a period of time a steady state equilibrium will be reached wherein the pressure in gallery G1, accumulator A1, gallery 30 and in the first fluid chamber C1 are all equal. The magnitude of this steady state pressure (the target pressure) will determine the appropriate pump speed, bearing in mind the leakage characteristics of the pump. In the interest of system performance, it is desirable to minimize the time taken to reach the target pressure, and to minimize the energy used to charge accumulator A1. To this end, accumulator A3 is a relatively small capacity accumulator.

When the inside wheel hits a bump, hydraulic fluid flowing out of the second fluid chamber C2 will be damped by valve V3A in a manner similar to that as described above in example 1. Similarly, when the inside wheel hits a pot hole, hydraulic fluid flowing out of hydraulic chamber C1 will be damped by valve V1A in a manner similar to that as described above in example 1. Large bumps and large pot holes are accommodated similarly as described above in example 1.

Example 3

In this case, the vehicle is travelling in a straight line and the weight of the vehicle associated with wheel 12 is substantially entirely carried by spring 20, and hence the actuator is not generating any significant vertical force, i.e. the actuator is not generating an extension force, nor is it generating a contraction force. In the event that wheel 12 hits a bump, the wheel moves up relative to the body causing contraction of the actuator 18 resulting in hydraulic fluid being expelled from chamber C2 and passing through valve V3A thereby damping contractive movement of the actuator. Simultaneously hydraulic fluid will flow into fluid chamber C1 via valve V1B primarily from accumulator A1.

As will be appreciated, when the vehicle hits a bump then valve V3A acts as a damper.

As will also be appreciated, when the vehicle travels in a straight line and the wheel hits a pot hole, then the actuator 18 will tend to extend resulting in valve VIA acting as a damper valve. Thus, extension of the actuator 18 is damped by valve VIA and contraction of the actuator 18 is damped by valve V3A.

Gallery G1 includes a flexible hydraulic line in the form of hose H1 having a first end H1A and a second end H1B. The pump P, valve V2, and check valve X1 are all attached to the body 16 and hence form part of the sprung mass of the vehicle. End H1A of hose H1 also forms part of the sprung mass of the vehicle. In contrast, cylinder 22, gallery 30, valve V1, accumulator A1 and end H1B of hose H1 all form part of the unsprung mass of the vehicle. Hose H1 therefore accommodates the relative movement between the sprung mass and unsprung mass of the vehicle.

Similarly, gallery G3 includes a flexible hydraulic line in the form of hose H2 which has a first end H2A and a second end H2B. First end H2A, valve V4, check valve X2, and accumulator A2 all form part of the sprung mass of the vehicle, whereas end H2B, accumulator A3, valve V3 and hydraulic gallery 32 all form part of the unsprung mass of the vehicle.

As can be seen from FIG. 2, part of the first hydraulic circuit 28 (that part to the right of end H1A of hose H1 when viewing FIG. 2) define sprung mass of the vehicle, and another part of the first hydraulic circuit 28 (that part to the left of end H1B of hose H1 when viewing FIG. 2) define unsprung mass of the vehicle. Significantly, the first hydraulic circuit 28 only has a single flexible hydraulic line having a first end defining a sprung mass and a second end defining an unsprung mass.

Similarly, the second hydraulic circuit 29 has a single flexible hydraulic line having a first end H2A defining a sprung mass and a second end H2B defining an unsprung mass. As will be appreciated from FIG. 2 there are only two hydraulic lines (H1 and H2) per ground engaging structure (e.g. per wheel 12) needed to accommodate the movement between the sprung mass and unsprung mass of the ground engaging structure of the vehicle.

Accumulator A1 may be mounted on cylinder 22. Valve V1 may be mounted on cylinder 22. The hydraulic pathway between accumulator A2 and chamber C1 includes valve V2, check valve X1, and hydraulic hose H1 whereas the hydraulic connection between accumulator A1 and chamber C1 does not include valve V1, X1 or hose H1. Because of this accumulator A1 is better able to accommodate high frequency flow variations, such as caused by road induced inputs.

Accumulator A3 may be mounted on cylinder 22. Valve V3 may be mounted on cylinder 22. The hydraulic pathway between accumulator A2 and chamber C2 includes valve V4, check valve X2, and hydraulic hose H2 whereas the hydraulic connection between accumulator A3 and chamber C2 does not include valve V4, X2 or hose H2. Because of this accumulator A3 is better able to accommodate high frequency flow variations, such as caused by road induced inputs.

Actuator 18 has a full stroke, i.e. the full stroke of actuator 18 is the difference between its fully extended length and its fully contracted length. The difference in volume of chamber C1 between when the actuator 18 is fully extended and fully contracted defines a full stroke volume of the first fluid chamber C1. Similarly, the difference in volume of the second fluid chamber C2 between when the actuator 18 is fully extended and fully contracted defines a full stroke volume of the second fluid chamber C2. The difference between the full stroke volume of the first chamber and the full stroke volume of the second fluid chamber defines a full stroke differential volume of the actuator 18.

The volume of the second A2 accumulator may be greater than the full stroke differential volume of the actuator 18.

As will be appreciated, the first fluid chamber C1 can vent fluid to hydraulic accumulators A1 and/or A2. Since hydraulic accumulator A1 is a relatively close both physically and hydraulically to the first fluid chamber C1 this accumulator can accommodate high frequency road induced inputs which tend to require relatively low mounts of hydraulic fluid to accommodate. Conversely the hydraulic accumulator A2, being larger, is better able to accommodate larger volumes of hydraulic fluid associated with larger relative movements of the piston within the cylinder 22 often associated with low frequency driver induced inputs.

As will be appreciated, the second fluid chamber C2 can vent fluid to hydraulic accumulators A3 and/or A2. Since hydraulic accumulator A3 is a relatively close both physically and hydraulically to the second fluid chamber C2 this accumulator can accommodate high frequency road induced inputs which tend to require relatively low mounts of hydraulic fluid to accommodate. Conversely the hydraulic accumulator A2, being larger, is better able to accommodate larger volumes of hydraulic fluid associated with larger relative movements of the piston within the cylinder 22 often associated with low frequency driver induced inputs.

As mentioned above, valve V2 is a variable pressure relief valve and the relief valve setting of valve V2 can be varied to suit the particular circumstances. In particular, the relief valve pressure setting of valve V2 may be dependent upon a target pressure in the first chamber C1. Typically the relief valve pressure for valve V2 will be set at the target pressure for chamber C1.

As mentioned above, valve V4 is a variable pressure relief valve and the relief valve setting of valve V4 can be varied to suit the particular circumstances. In particular, the relief valve pressure setting of valve V4 may be dependent upon a target pressure in the second chamber C2. Typically the relief valve pressure for valve V4 will be set at the target pressure for chamber C2.

In further embodiments the ground engaging structure may be a vehicle track and the vehicle may be a track laying vehicle.

As described above, in the various examples, the vehicle is being driven by a driver. In further embodiments, the vehicle may be an autonomous vehicle and therefore may not have a driver.

The invention claimed is:

1. An actuator system for a vehicle suspension system comprising:
   an actuator having a piston and a first fluid chamber separated from a second fluid chamber by the piston;
   a hydraulic pump having a first port connected by a first hydraulic circuit to the first chamber via a first valve, the first valve being a damper valve operable to variably restrict flow of hydraulic fluid out of the first chamber;
   a first hydraulic accumulator connected to the first hydraulic circuit between the first port and the first valve;
   a second hydraulic accumulator connected to a second gallery, the hydraulic pump having a second port connected by a second hydraulic circuit to the second chamber via a third valve, the third valve being a damper valve operable to variably restrict flow of hydraulic fluid out of the second chamber; and
   a third hydraulic accumulator connected to the second hydraulic circuit between the second port and the third valve;
   wherein the first hydraulic circuit has a first gallery being connected to the second accumulator by a second valve, the second valve being a variable pressure relief valve operable to variably restrict flow of hydraulic fluid from the first gallery to the second gallery, the second hydraulic circuit having a third gallery being connected to the second accumulator by a fourth valve, the fourth valve being a variable pressure relief valve operable to variably restrict flow of hydraulic fluid from the third gallery to the second gallery.

2. The actuator system of claim 1, wherein the actuator has a full stroke differential volume defined by a difference between a full stroke volume of the first chamber and a full stroke volume of the second chamber and the second accumulator is sized to receive all of the full stroke differential volume.

3. The actuator system of claim 2 including a valve operable to allow flow of hydraulic fluid from the second gallery to the first gallery but prevent flow of hydraulic fluid from the first gallery to the second gallery.

4. The actuator system of claim 2 including a valve operable to allow the flow of hydraulic fluid from the second gallery to the third gallery but prevent flow of hydraulic fluid from the third gallery to the second gallery.

5. The actuator system of claim 1 wherein the pump is a reversible pump.

6. The actuator system of claim 1, wherein the actuator has a full stroke differential volume defined by a difference between a full stroke volume of the first chamber and a full stroke volume of the second chamber and the second accumulator is sized to receive all of the full stroke differential volume, and wherein the pump is a reversible pump.

7. The actuator system of claim 1 including a valve operable to allow flow of hydraulic fluid from the second gallery to the first gallery but prevent flow of hydraulic fluid from the first gallery to the second gallery.

8. The actuator system of claim 1 including a valve operable to allow the flow of hydraulic fluid from the second gallery to the third gallery but prevent flow of hydraulic fluid from the third gallery to the second gallery.

9. A vehicle including a ground engaging structure mounted on a suspension system attached to a vehicle body thereby defining a sprung mass and an unsprung mass, the vehicle including the actuator system as defined in claim 1 acting at least to partially support the sprung mass on the unsprung mass,
   wherein one or more or all of the first valve, first accumulator, third valve, and third accumulator define at least a part of the unsprung mass, and/or
   wherein one or more or all of the second valve, second accumulator, fourth valve, and pump define at least a part of the sprung mass.

10. The vehicle of claim 9 wherein the second hydraulic circuit has a second hydraulic circuit sprung portion defining the sprung mass and a second hydraulic circuit unsprung portion defining the unsprung mass and a single flexible hydraulic line connecting the second hydraulic circuit sprung portion to the second hydraulic circuit unsprung portion, the single flexible hydraulic line having a first end defining the sprung mass and a second end defining the unsprung mass, and/or wherein the first hydraulic circuit has a first hydraulic circuit sprung portion defining the sprung mass and a first hydraulic circuit unsprung portion defining the unsprung mass and a single flexible hydraulic line connecting the first hydraulic circuit sprung portion to the first hydraulic circuit unsprung portion, the single flexible hydraulic line having a first end defining a sprung mass and a second end defining an unsprung mass.

11. A method of operating the vehicle of claim 9, the method including:
   a) defining a first target pressure for the first chamber,
   b) operating the pump to generate the first target pressure in the first chamber and the first accumulator,
   c) setting the second valve relief pressure to a value dependent upon the first target pressure.

12. The method of claim 11 when during b) the pump pumps hydraulic fluid from the second hydraulic circuit to the first hydraulic circuit.

13. The method of claim 11, the method including subsequently:
- d) defining a second target pressure for the second chamber,
- e) operating the pump to generate the second target pressure in the second chamber, and the third accumulator,
- f) setting the fourth valve relief pressure to a value dependent upon the second target pressure.

14. The method of claim 13 wherein during e) the pump pumps hydraulic fluid from the first hydraulic circuit to the second hydraulic circuit.

15. A vehicle including a ground engaging structure mounted on a suspension system attached to a vehicle body thereby defining a sprung mass and an unsprung mass, the vehicle including the actuator system as defined in claim 1, wherein the actuator has a full stroke differential volume defined by a difference between a full stroke volume of the first chamber and a full stroke volume of the second chamber and the second accumulator is sized to receive all of the full stroke differential volume, acting at least to partially support the sprung mass on the unsprung mass,
- wherein one or more or all of the first valve, first accumulator, third valve, and third accumulator define at least a part of the unsprung mass, and/or
- wherein one or more or all of the second valve, second accumulator, fourth valve, and pump define at least a part of the sprung mass.

16. The vehicle of claim 15 wherein the second hydraulic circuit has a second hydraulic circuit sprung portion defining the sprung mass and a second hydraulic circuit unsprung portion defining the unsprung mass and a single flexible hydraulic line connecting the second hydraulic circuit sprung portion to the second hydraulic circuit unsprung portion, the single flexible hydraulic line having a first end defining the sprung mass and a second end defining the unsprung mass, and/or wherein the first hydraulic circuit has a first hydraulic circuit sprung portion defining the sprung mass and a first hydraulic circuit unsprung portion defining the unsprung mass and a single flexible hydraulic line connecting the first hydraulic circuit sprung portion to the first hydraulic circuit unsprung portion, the single flexible hydraulic line having a first end defining a sprung mass and a second end defining an unsprung mass.

17. A method of operating the vehicle of claim 15, the method including:
- a) defining a first target pressure for the first chamber,
- b) operating the pump to generate the first target pressure in the first chamber and the first accumulator,
- c) setting the second valve relief pressure to a value dependent upon the first target pressure.

18. The method of claim 17 when during b) the pump pumps hydraulic fluid from the second hydraulic circuit to the first hydraulic circuit.

19. The method of claim 17, the method including subsequently:
- d) defining a second target pressure for the second chamber,
- e) operating the pump to generate the second target pressure in the second chamber, and the third accumulator,
- f) setting the fourth valve relief pressure to a value dependent upon the second target pressure.

20. The method of claim 19 wherein during e) the pump pumps hydraulic fluid from the first hydraulic circuit to the second hydraulic circuit.

* * * * *